(12) United States Patent
Albers

(10) Patent No.: US 6,400,275 B1
(45) Date of Patent: Jun. 4, 2002

(54) AUDITORY CUES FOR NOTIFICATION OF DEVICE ACTIVITY

(75) Inventor: Michael C. Albers, San Francisco, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/338,837

(22) Filed: Jun. 23, 1999

(51) Int. Cl.[7] ............................................. G08B 21/00
(52) U.S. Cl. .................. 340/635; 340/286.02; 340/692; 709/224
(58) Field of Search ................................ 340/635, 692, 340/286.02; 709/221, 223, 224

(56) References Cited

U.S. PATENT DOCUMENTS 6,185,611 B1 * 2/2001 Waldo et al. ............... 709/221
6,195,004 B1 * 2/2001 Leonowich .................. 340/539

* cited by examiner

*Primary Examiner*—Edward Lefkowitz
(74) *Attorney, Agent, or Firm*—Thelen Reid & Priest LLP; David B. Ritchie

(57) ABSTRACT

A method for providing network device status notification includes providing at least one auditory cue to indicate at least one device status. According to one aspect, distinct auditory cues are provided when a device begins looking for a federation, when a device has connected to federation and when a device has disconnected from a federation. A network device includes a network interface and an auditory cue unit coupled to the network interface to provide at least one auditory cue to indicate at least one activity status.

17 Claims, 2 Drawing Sheets

AUDITORY CUES FOR NOTIFICATION OF DEVICE ACTIVITY

BACKGROUND OF THE INVENTION

1. Field of the Invention

The present invention relates to networking systems. More particularly, the present invention relates to auditory cues for notification of device activity.

2. Background

The purpose of the Jini™ architecture is to federate groups of devices and software components into a single, dynamic distributed system. The resulting federation is provides the simplicity of access, ease of administration and support for sharing that are provided by a large monolithic system while retaining the flexibility, uniform response and control provided by a personal computer or workstation.

The concept of a service is central to the Jini™ architecture. A service is an entity that can be used by a person, a program or another service. A service may be a computation, storage, a communication channel to another user, a software filter, a hardware device or another user. Two examples of services are printing a document and translating from one word-processor format to another.

Members of a Jini™ system federate in order to share access to services. A Jini™ system consists of services that can be collected together for the performance of a particular task. Services may make use of other services, and a client of one service may itself be a service with clients of its own. The dynamic nature of a Jini™ system enables services to be added or withdrawn from a federation at any time according to demand, need or the changing requirements of the workgroup using the system.

Jini™ systems provide mechanisms for service construction, lookup, communication, and use in a distributed system. Examples of services include: devices such as printers, displays or disks; software such as applications or utilities; information such as databases and files; and users of the system.

Services are found and resolved by a lookup service. The lookup service is the central bootstrapping mechanism for the system and provides the major point of contact between the system and users of the system. Devices and services register with the lookup service. When a device plugs in, it goes through an add-in protocol, called discovery, and join-in. The device first locates the lookup service (discovery) and then uploads an object that implements all of its services' interfaces (join).

When a device registers with a lookup service it receives a lease. Periodically, the device will need to renew the lease with the lookup service. If the device fails to renew the lease, then when the lease expires, the lookup service will remove the entry for it, and the service will no longer be available.

To date, Jini™ development efforts have focused on ensuring the correct functioning of Jini™ technology. The emphasis has been on ensuring the mechanism existed for federating groups of devices and software components into a single, dynamic distributed system. Little emphasis was placed on informing a Jini™ system user of the status of various devices within a Jini™ federation. However, providing feedback to the user of a Jini™ system is important, particularly with respect to unexpected events.

While devices are progressing through various stages of connectivity in a federation, it is desirable to have some indication of the device status. Some devices have display screens for the textual display of status information. However, many devices have small liquid crystal displays (LCDs) that are hard to read, making the textual display of status information impractical. Furthermore, several devices such as storage devices have no display whatsoever, making the textual display of status information impossible. Adding a display to simple devices just to convey status information is often not cost efficient. Accordingly, a need exists in the prior art for a cost-efficient non-visual method for notification of network device activity.

BRIEF DESCRIPTION OF THE INVENTION

A method for providing network device status notification includes providing at least one auditory cue to indicate at least one device status. According to one aspect, distinct auditory cues are provided when a device begins looking for a federation, when a device has connected to federation and when a device has disconnected from a federation. A network device includes a network interface and an auditory cue unit coupled to the network interface to provide at least one auditory cue to indicate at least one activity status.

DETAILED DESCRIPTION OF THE PREFERRED EMBODIMENTS

Those of ordinary skill in the art will realize that the following description of the present invention is illustrative only. Other embodiments of the invention will readily suggest themselves to such skilled persons having the benefit of this disclosure.

This invention relates to networking systems. More particularly, the present invention relates to auditory cues for notification of network device activity. The invention further relates to machine readable media on which are stored (1) the layout parameters of the present invention and/or (2) program instructions for using the present invention in performing operations on a computer. Such media includes by way of example magnetic tape, magnetic disks, optically readable media such as CD ROMs and semiconductor memory such as PCMCIA cards. The medium may also take the form of a portable item such as a small disk, diskette or cassette. The medium may also take the form of a larger or immobile item such as a hard disk drive or a computer RAM.

According to the present invention, users of a network device receive auditory cues to indicate network device status. The present invention allows device users to be informed of important device status events, such as network device connection or disconnection, without costly and impractical visual displays.

Although the network architecture described herein is described with reference to Jini™ federations, the invention has a broader scope. The invention could include any network architecture. The present invention may be applied to any arbitrarily assembled collection of nodes linked together as a network of devices.

Figure 1:
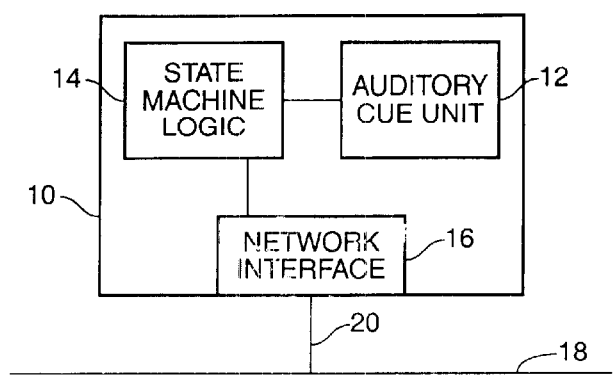
FIG. 1 is a block diagram that illustrates a network device in accordance with one embodiment of the present invention.

Turning now to FIG. 1, a block diagram that illustrates a network device in accordance with one embodiment of the present invention is presented. Network device 10 includes an auditory cue unit 12, state machine logic 14 and a network interface 16. The network interface 10 is operatively coupled to bus 18 via bus connection 20. The state machine logic 14 incorporates all the logic circuitry for carrying out the methodologies and algorithms to be described herein. The circuitry may comprise a programmable logic array (PLA) or be uniquely designed to carry out the functions described herein. The auditory cue unit 12 creates at least one sound in response to at least one status signal from state machine logic 14.

According to another embodiment of the present invention, the network device 10 includes a connection detector. The connection detector detects when a network connection is being sought, when a network connection has been established and when a network connection has been terminated. Those of ordinary skill in the art will recognize that the invention may be applied to many other network statuses.

Figure 2A:
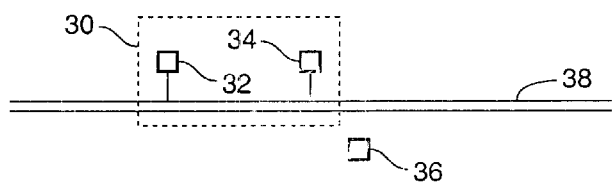
FIG. 2A is a block diagram that illustrates providing auditory notification of network device status in accordance with one embodiment of the present invention.

FIGS. 2A to 2D are block diagrams that illustrate providing auditory cues based upon network device status according to one embodiment of the present invention. FIG. 2A illustrates a Jini™ federation 30 with two devices 32 and 34. Device 36 is not connected to the network 38. Devices 32, 34 and 36 include a network interface and an auditory cue unit coupled to the network interface. The auditory cue unit provides at least one auditory cue to indicate at least one activity status.

Figure 2B:
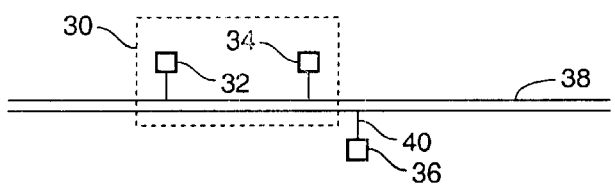
FIG. 2B is a block diagram that illustrates providing auditory notification of network device status in accordance with one embodiment of the present invention.

In FIG. 2B, device 36 is connected to the network 38. Line 40 represents a physical connection or a wireless connection, depending upon the particular devices used. In this state, device 36 initiates its add-in protocol, including discovery and join-in. A first sound is issued when the add-in protocol begins.

Figure 2C:
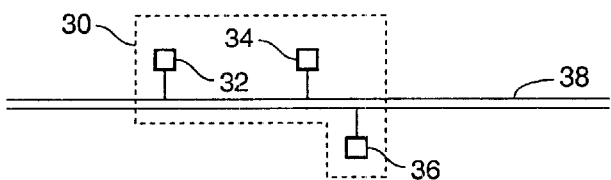
FIG. 2C is a block diagram that illustrates providing auditory notification of network device status in accordance with one embodiment of the present invention.

In FIG. 2C, device 36 has completed its add-in protocol and has joined federation 30. A second sound is issued when the add-in protocol has completed.

Figure 2D:
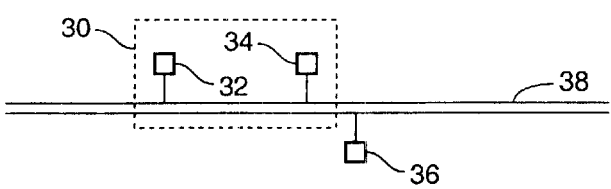
FIG. 2D is a block diagram that illustrates providing auditory notification of network device status in accordance with one embodiment of the present invention.

In FIG. 2D, device 36 has disconnected from federation 30. The device 36 may be disconnected for many reasons; the device 36 may be moved to an out-of-range location, a lease of a service may expire, or the physical connection may be severed. A third sound is issued to indicate the device 36 has been disconnected from the federation 30.

Figure 3:
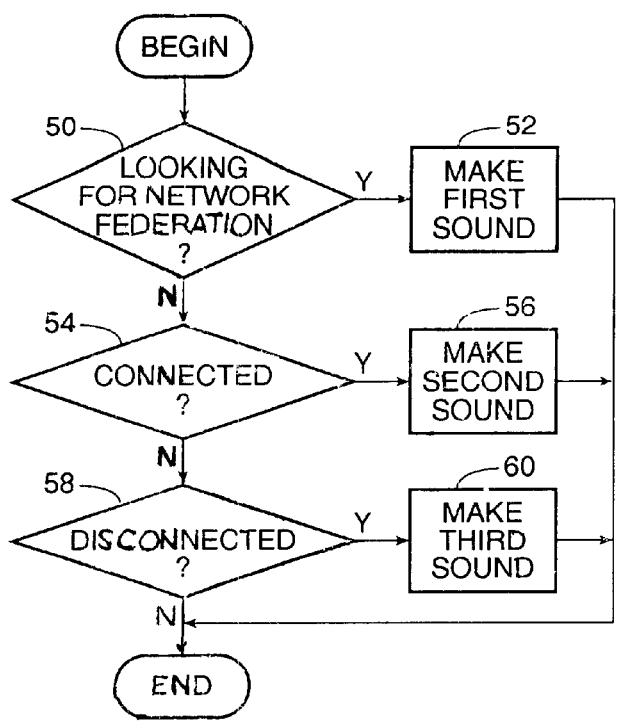
FIG. 3 is a flow diagram that illustrates a method for providing auditory notification of network device status in accordance with one embodiment of the present invention.
Figure 4:
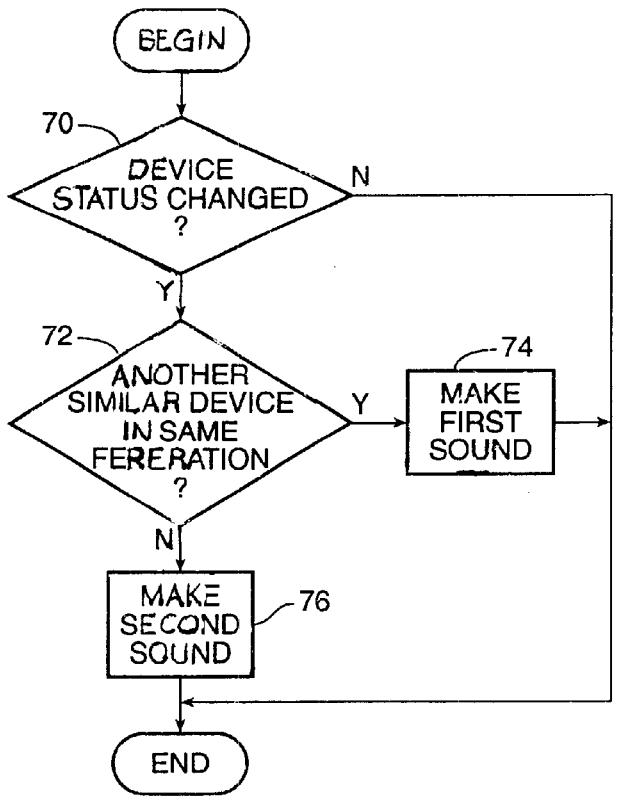
FIG. 4 is a flow diagram that illustrates a method for providing auditory notification of network device status in accordance with one embodiment of the present invention.

Turning now to FIG. 3, a method for providing auditory notification to indicate network device status is presented. At reference numeral 50, a check is made to determine whether the device has just made a network connection and has started looking for a federation. If the device 36 has just started to look for a federation, a first sound is made at reference numeral 52. At reference numeral 54, a check is made to determine whether the device has just joined a federation. If the device 36 has just joined a federation, a second sound is made at reference numeral 36. At reference numeral 58, a check is made to determine whether the device 36 has become disconnected from the federation 30. If the device 36 has become disconnected, a third sound is made at reference numeral 60.

The above reference to specific statuses is not intended to be limiting in any way. Those of ordinary skill in the art will recognize that the invention is applicable to other statuses as well. For instance, different sounds could be used to indicate whether a device 36 has been selected to provide a service, or to indicate a device 36 is no longer providing a service. Additionally, different sounds could be used to indicate the quality of the network connection. Those of ordinary skill in the art will recognize that there are many ways of measuring the quality of a network connection, including throughput, transit delay and residual error ratio.

According to another embodiment of the present invention, each of the sounds used to indicate device status is unique, and each sound is selected to be contextually salient. In other words, each sound is selected such that it is clearly distinguished from other device status sounds.

According to another embodiment of the present invention, a device 36 selects the sound used to indicate a status based upon a predetermined criteria. The predetermined criteria may include determining whether other similar devices are currently members of the same federation. For example, suppose there are multiple devices in a room, all of which are members of the same federation. One of the devices is a personal digital assistant (PDA). If another person with a second PDA walks in the room, the second PDA will issue sounds based on its connection status. If the sounds issued by both PDAs were the same, it might be difficult to discern which device issued the sound. According to this embodiment of the present invention, the second PDA would issue a sound that differs from the default sound for a particular status, thus unambiguously identifying both the device and its status.

Turning now to FIG. 3, a method for providing auditory notification of network device status in accordance with one embodiment of the present invention is presented. At reference numeral 70, a check is made to determine whether a device status has changed. If the device status has changed, a check is made at reference numeral 72 to determine whether another similar device exists in the same federation. If another similar device exists in the same federation, a first sound is made at reference numeral 74. Otherwise, a second sound is made at reference numeral 76.

According to a presently preferred embodiment, the present invention may be implemented in software or firmware, as well as in programmable gate array devices, Application Specific Integrated Circuits (ASICs), and other hardware.

Thus, a novel method for providing auditory notification of network device status has been described. While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for providing network device activity notification, said method comprising providing at least one auditory cue whenever a network device status changes, said providing further comprising:

providing a first auditory cue to indicate the device is looking for a federation;

providing a second auditory cue to indicate the device has connected to said federation; and providing a third auditory cue to indicate the device has disconnected from said federation.

2. The method of claim 1 wherein providing at least one auditory cue further comprises providing a fourth auditory cue to indicate the quality of the device network connection.

3. The method of claim 1 wherein each of said first auditory cue, said second auditory cue and said third auditory cue is different with respect to other auditory cues.

4. A method for providing network device activity notification, said method comprising providing at least one auditory cue to indicate at least one network device activity status, said providing further comprising:

providing a first auditory cue to indicate the device is looking for a federation;

providing a second auditory cue to indicate the device has connected to said federation; and providing a third auditory cue to indicate the device has disconnected from said federation.

5. The method of claim 4 wherein providing at least one auditory cue further comprises providing a fourth auditory cue to indicate the quality of the device network connection.

6. The method of claim 4 wherein each of said first auditory cue, said second auditory cue and said third auditory cue is different with respect to other auditory cues.

7. A network device comprising:

a network interface;

a processor coupled to said network interface;

an auditory cue unit coupled to said processor, said auditory cue unit to provide at least one auditory cue to indicate at least one device activity status in response to at least one status signal from said processor; and a connection detector to detect when a network connection is being sought, when a network connection has been established and when a network connection has been terminated, the connection detector operatively coupled to said auditory cue unit via said at least one status signal.

8. The network device of claim 7 wherein said connection detector further detects the quality of the device network connection.

9. The network device of claim 7 wherein each auditory cue is different with respect to other auditory cues.

10. The network device of claim 7 wherein said network device comprises a Jini™ device.

11. A program storage device readable by a machine, embodying a program of instructions executable by the machine to perform a method for at least one auditory cue whenever a network device status changes, the method further comprising:

providing a first auditory cue to indicate the device is looking for a federation;

providing a second auditory cue to indicate the device has connected to said federation; and providing a third auditory cue to indicate the device has disconnected from said federation.

12. The program storage device of claim 11 wherein providing at least one auditory cue further comprises providing a fourth auditory cue to indicate the quality of the device network connection.

13. The program storage device of claim 11 wherein each of said first auditory cue, said second auditory cue and said third auditory cue is different with respect to other auditory cues.

14. An apparatus for providing network device activity notification, said apparatus comprising:

means for providing at least one auditory cue to indicate at least one network device activity status, said means for providing at least one auditory cue further comprising:

means for providing a first auditory cue to indicate the device is looking for a federation;

means for providing a second auditory cue to indicate the device has connected to said federation; and means for providing a third auditory cue to indicate the device has disconnected from said federation.

15. The apparatus of claim 14 wherein said means for providing at least one auditory cue further comprises means for providing a fourth auditory cue to indicate the quality of the device network connection.

16. The apparatus of claim 14 wherein each of said first auditory cue, said second auditory cue and said third auditory cue is different with respect to other auditory cues.

17. A network device, said device comprising:

a network interface;

a processor coupled to said network interface;

an auditory cue unit coupled to said processor, said auditory cue unit to provide at least one auditory cue to indicate at least one device activity status in response to at least one status signal from said processor; and a connection detector to detect when a network connection is being sought, when a network connection has been established and when a network connection has been terminated, the connection detector operatively coupled to said auditory cue unit via said at least one status signal.

* * * * *